United States Patent
Diaz et al.

(10) Patent No.: US 10,171,313 B2
(45) Date of Patent: Jan. 1, 2019

(54) MANAGING WORKLOAD TO MEET EXECUTION CRITERION IN A HYBRID CLOUD ENVIRONMENT

(71) Applicant: International Business Machines Corporation, Armonk, NY (US)

(72) Inventors: Angel L. Diaz, Carmel, NY (US); David L. Kaminsky, Chapel Hill, NC (US); Thai Q. Tran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 461 days.

(21) Appl. No.: 14/604,277

(22) Filed: Jan. 23, 2015

(65) Prior Publication Data
US 2016/0218990 A1    Jul. 28, 2016

(51) Int. Cl.
*H04L 12/24*    (2006.01)
*H04L 12/26*    (2006.01)

(52) U.S. Cl.
CPC ...... *H04L 41/5019* (2013.01); *H04L 43/0888* (2013.01)

(58) Field of Classification Search
CPC .................................................. H04L 41/5019
USPC ...................................................... 709/226
See application file for complete search history.

(56) References Cited

U.S. PATENT DOCUMENTS

| 8,606,924 | B2 | 12/2013 | Gujral et al. | |
| 2012/0204187 | A1* | 8/2012 | Breiter | G06F 9/5072 718/105 |
| 2012/0254433 | A1* | 10/2012 | Gujral | G06F 9/5072 709/226 |
| 2013/0014107 | A1 | 1/2013 | Kirchhofer | |
| 2015/0134424 | A1* | 5/2015 | Matzlavi | G06Q 10/0637 705/7.36 |
| 2015/0234670 | A1* | 8/2015 | Shimogawa | G06F 9/45533 718/1 |

OTHER PUBLICATIONS

IBM, "Tivoli Monitoring", printed on Dec. 22, 2014, 2 pages, http://www-03.ibm.com/software/products/en/tivomoni/.
IBM, "Tivoli Provisioning Monitoring", printed on Dec. 22, 2014, 2 pages, http://www-03.ibm.com/software/products/en/ibmtivoprovmana/.

(Continued)

*Primary Examiner* — Suraj M Joshi
(74) *Attorney, Agent, or Firm* — Scully, Scott, Murphy & Presser, P.C.; William H. Hartwell

(57) ABSTRACT

Managing workload in a computing environment, in one aspect, may include monitoring an execution behavior of a portion of a job executing on the external computing resources. The execution behavior of the portion of the job executing on the external computing resources may be compared to the behavior required to attain at least one performance objective. If the comparison indicates that a performance objective is not being met, whether allocating additional internal resources would improve the overall performance as compared to the objective may be determined. If the determination indicates that allocating additional internal resources would improve the overall performance, at least one additional resource may be allocated.

19 Claims, 4 Drawing Sheets

(56) References Cited

OTHER PUBLICATIONS

Hurwitz, J., et al., "What is Hybrid Cloud Computing", printed on Dec. 22, 2014, 2 pages, http://www.dummies.com/how-to/content/what-is-hybrid-cloud-computing.html.

Griffith, J., IBM Tivoli Application Performance Management Implementing the End User Experience Monitoring Solution, 45 pages, https://www.ibm.com/developerworks/community/blogs/7d5ebce8-2dd8-449c-a58e-4676134e3eb8/resource/ImplementingtheEndUserExperienceMonitoringSolution.pdf?lang=en.

Wikipedia, "Tivoli Provisioning Manager", last modified Nov. 25, 2014, 3 pages, http://en.wikipedia.org/wiki/Tivoli_Provisioning_Manager.

* cited by examiner

MANAGING WORKLOAD TO MEET EXECUTION CRITERION IN A HYBRID CLOUD ENVIRONMENT

FIELD

The present application relates generally to computers and computer applications, and more particularly to managing workload to meet execution criterion in a computing environment.

BACKGROUND

In an infrastructure where a provider or entity has end-to-end control of computing components, managing the infrastructure to meet a service level agreement (SLA) may be relatively straightforward: for example, if a job is proceeding too slowly, additional resources can be assigned to the job, for example, taking resources away from jobs that are exceeding their SLA guarantees. If it not possible to meet all SLA guarantees, then an economic analysis may be performed on the infrastructure to determine which allocation of resources produces the best result, which typically entails preferring high priority jobs over lower priority jobs.

In a hybrid Cloud environment, where the infrastructure provider controls only a subset of the resources required to complete the job, optimizing for an SLA is far more challenging. For example, resource reallocation performed internally can be defeated by actions taken on external resources.

BRIEF SUMMARY

A method and system for managing workload in a computing environment may be provided. The method, in one aspect, may comprise monitoring execution behavior of a portion of a job that is executing on a second set of the computing resources, the job running on a first set of computing resources and a second set of computing resources. The first set of computing resources comprises internal resources of an infrastructure and the second set of computing resources comprises external resources of the infrastructure. The method may also comprise comparing the execution behavior of a portion of the job that is running on the second set of the computing resources with target behavior for meeting at least one execution criterion. The method may also comprise, responsive to determining that the job does not meet the execution criterion, determining whether allocating a third set of computing resources internal to the infrastructure would improve overall performance of the job in meeting the execution criterion. The method may also comprise allocating at least one computing resource in the third set of computing resources to the job.

A system of managing workload, in one aspect, may comprise a processor and a first set of computing resources. A job may be running on the first set of computing resources and a second set of computing resources, wherein the first set of computing resources comprise internal resources of an infrastructure and the second set of computing resources comprise external resources of the infrastructure. The processor may be further operable to monitor an execution behavior of a portion of a job that is executing on a second set of the computing resources. The processor may be further operable to compare the execution behavior of the portion of the job that is running on the second set of the computing resources with a target behavior for meeting at least one execution criterion. Responsive to determining that the job does not meet the execution criterion, the processor may be further operable to determine whether allocating a third set of computing resources internal to the infrastructure would improve overall performance of the job in meeting the execution criterion. The processor may be further operable to allocate at least one computing resource in the third set of computing resources for the job.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
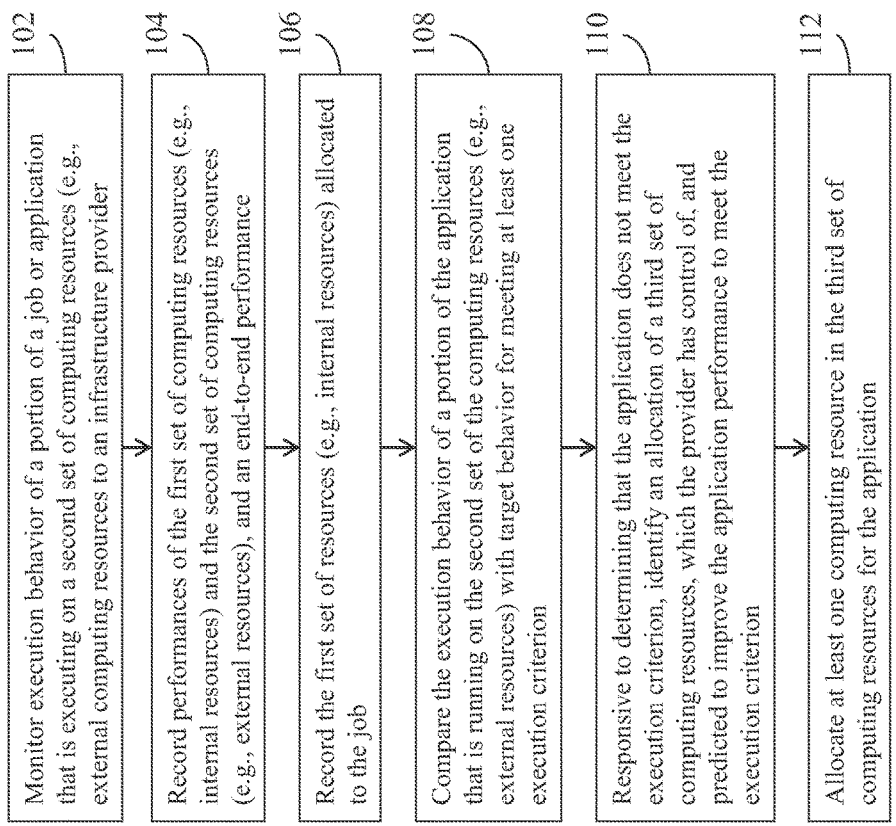
FIG. 1 is a flow diagram illustrating a method of managing workload in one embodiment of the present disclosure.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. The cloud model may include different characteristics, different service models and different deployment models.

Deployment models of cloud computing may include private cloud, community cloud, public cloud and hybrid cloud. In a private cloud computing environment, the cloud infrastructure is operated solely for an organization. It may be managed by the organization or a third party and may exist on premise or off premise.

In community cloud, the cloud infrastructure is shared by several organizations and supports a specific community that has shared concerns (e.g., mission, security requirements, policy, and compliance considerations). It may be managed by the organizations or a third party and may exist on premise or off premise. In public cloud, the cloud infrastructure is made available to the general public or a large industry group and is owned by an organization selling cloud services. In hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is usually service oriented with a focus on statelessnesss, low coupling, modularity, and semantic interoperability. At the heart of cloud computing is an infrastructure comprising a network of interconnected nodes. It is understood in advance that although this disclosure includes a detailed description on cloud computing, implementation of the teachings recited herein are not limited to a cloud computing environment. Rather, embodiments disclosed herein are capable of being implemented in conjunction with any other type of computing environment now known or later developed, as applicable.

Techniques may be presented for optimizing performance in a hybrid Cloud environment to meet execution criteria such as meeting an SLA. A method of workload management in one embodiment of the present disclosure may consider both the internal and external computing resources when managing to fulfill one or more execution criteria in a hybrid Cloud environment. The method in one embodiment may monitor historical behavior of external computing resources, and use that knowledge when allocating internal computing resources.

As briefly discussed above, in a hybrid cloud computing environment, an entity or organization provides and manages resources in-house and has others resources provided externally. For example, the entity or organization has control over (or manages) its internal resources (e.g., in-house resources), while it does not have control over (or does not manage) the external resources (e.g., resources provided by another organization). For instance, a hybrid cloud environment utilizes both private cloud and public cloud infrastructure. One set may be owned by one company and another set may be owned by another company such as a Cloud provider.

Examples of resources or computing resources may include processing power such as central processing unit and core, network bandwidth, memory, disk space, queues, and/or others resources.

An end-to-end objective or criterion can be logically broken into two pieces: the portion executed on the internal resources and the portion executed on the external resources. An example of an end-to-end objective may include a performance objective expressed in an SLA. By monitoring performance of all three components—internal, external and end-to-end—a methodology of the present disclosure in one embodiment may determine, for allocation of internal resources, the response time required while executing on the external resources. Consider, for example, user X making a request to a banking application provided by Bank X that is being hosted on a hybrid cloud. Some resources are internal to X and some are provided by Cloud provider C, which are external to X. Some parts of the application may run on C's servers (e.g., database lookups of less sensitive data), and other parts of the application may run on B's infrastructure (e.g., account lookups). The user perceives the end-to-end performance, but the actual processing is split between the two sets of computing resources.

Based on the comparison between the actual response time and a threshold value that controls what is acceptable (e.g., Company X may want all balance lookups to be completed in 1.0 seconds, but user queries take 1.1 seconds on average), a methodology of the present disclosure in one embodiment may determine whether the internal resources allocated are sufficient to meet the criterion, e.g., performance guarantees. For cases where the criterion, e.g., performance guarantee, will not be met (e.g., because the external resources become more sluggish), additional resources may be incrementally allocated to the internal system or components.

In one embodiment, each time a resource is added, a methodology of the present disclosure allows the internal and external components that make up the end-to-end system to attain performance equilibrium and takes another measurement. For example, when a server is added, it will take a period of time for enough new work to be allocated to the server until the full power of the server is realized (reaching equilibrium). During that time, it may be expected that the response time to drop. After the period of time it takes the full power of the server to be realized, another measurement may be taken. If the criterion or objective is still not met, the methodology of the present disclosure in one embodiment repeats the process.

In one embodiment, the methodology of the present disclosure may consider bottlenecks that may occur. For example, if the internal system is consuming inputs (such as data) from the external system at an optimal rate, and the external system then slows the production of these inputs (e.g., data arrives more slowly), then adding internal resource may not improve end-to-end performance. In such cases, no resources are reallocated, and the issue is logged.

FIG. 1 is a flow diagram illustrating a method of managing workload in one embodiment of the present disclosure, for example, to meet one or more execution criteria. An example of execution criteria may include performance criteria specified in a service level agreement (SLA), for example, performance level in throughput, transaction rate, latency, response time, and/or others.

At 102, an execution of an application or job is monitored. For example, the job or application is running on a hybrid (external/internal) cloud set of resources. For instance, the job or application is running on a first set of computing resources (e.g., internal resources to an infrastructure provider or an entity) and a second set of computing resources (e.g., external resources external to the infrastructure provider or the entity). In this case, the entity or the infrastructure provider has control over or can manage the first set of computing resources, but does not have control over or does not manage the second set of external resources (e.g., external resources). The running job or application needs to perform according to one or more execution criteria, e.g., meet an SLA. Tools such as Tivoli® from International Business Corporation, Armonk, N.Y., may be utilized to perform monitoring and provisioning of resources, e.g., Monitoring and/or Provisioning Manager. For example, a computer process or a system implementing a methodology of the present disclosure may interface with such tools monitor and obtain performance monitored data.

An application or job to monitor may be selected automatically, for example, when the job is started, or at another time. In another aspect, a job to monitor may be selected manually, for example, as an input from a user via a user interface.

Monitoring, for example, may include monitoring the execution behavior of the portion of the job that is executing on the external computing resources (referred to as a second set of resources).

At 104, performance of the internal resources (referred to as a first set of resources or computing resources), performance of external resources (referred to as a second set of resources or computing resources), and an end-to-end performance are recorded.

The end-to-end performance refers to the overall application's performance running on the internal and external set of resources. At 106, the internal resources (referred to as a first set of resources) allocated to the job are also recorded.

The recorded history of resource utilization and performance of the application may be utilized, for example, by an analytics process to analyze and identify relationships between resource availability and performance characteristics of the application.

At 108, the execution behavior of the portion of the job executing on the external computing resources (referred to as a second set of computing resources or resources) is compared to the behavior required to attain at least one performance objective, e.g., target behavior for meeting an execution criterion.

Execution behavior of the portion of the job executing on the external computing resources may be obtained using one or more tools such as Tivoli® monitoring tools. To obtain the execution behavior of the portion of the job executing on the external computing resources, e.g., a methodology of the present disclosure in one embodiment may measure end-to-end (e2e) performance results at the server (internal computing resource). In another embodiment, a monitoring agent may be placed on the external computing resources (e.g., a user's machine). In this case, the methodology of the present disclosure may directly measure the e2e performance, and also measure the performance of a part of the job running on internal computing resources (e.g., the parts that an organization controls). Behavior required to attain at least one performance object may be user specified, e.g., received from a user. For instance, the behavior required to attain at least one performance object may specified in a Service level agreement (SLA).

At 110, responsive to detecting that the behavior required to attain at least one execution criterion (e.g., performance objective) is not met, e.g., the external resource performance is dropping below the level needed to meet the execution criterion of the job, e.g., a level required to meet the end-to-end performance guarantee, a method in embodiment determines whether adjusting the resources within the second set of resources would improve the end-to-end performance. For example, a method may determine or identify whether allocating additional third set of resources (e.g., internal resources) will improve performance. For instance, if is determined that the execution behavior of the portion of the job executing on the external computing resources does not meet the execution criterion, it is determined whether allocating a third set of computing resources internal to the infrastructure (additional internal resources) would improve overall performance of the job in meeting the execution criterion. For example, the methodology of the present disclosure may monitor the capacity of the resource in question (e.g., internal computing resource). For example, if a CPU is only 25% utilized, then adding another CPU may not help since the existing one is not under stress. Conversely, if the CPU is 100% used, it is a possible indication of a bottleneck. In that case, the methodology of the present disclosure may determine that adding one or more additional resources would improve performance.

Responsive to determining that adjusting the resources within the second set of resources would improve the end-to-end performance, the second set of resources may be adjusted. For example, responsive to determining that the additional allocation will improve performance, at least one resource is allocated at 112. Resources for example may include but are not limited to one or more of processing power, memory, disk space, and queues. Resources may be automatically provisioned, e.g., by interfacing to provisioning tools such as Tivoli®.

In one aspect, the above methodology may be employed, for example, in a scenario in which the resources that are allocated at 112 do not affect the performance of other jobs that are also using those resources or were using those resources. For instance, reallocating a resource may not result in another job missing an execution criterion (e.g., an SLA guarantee), if that other job is comfortably attaining its goals. In this case, there is no risk in performing the reallocation.

In another scenario, reallocating a resource may result in another job missing its execution criterion (e.g., an SLA guarantee), for example, if the other job is more marginally attaining its goals. In this case, an embodiment of a methodology of the present disclosure compares the priority of the two jobs to determine whether the reallocation should occur.

Figure 2:
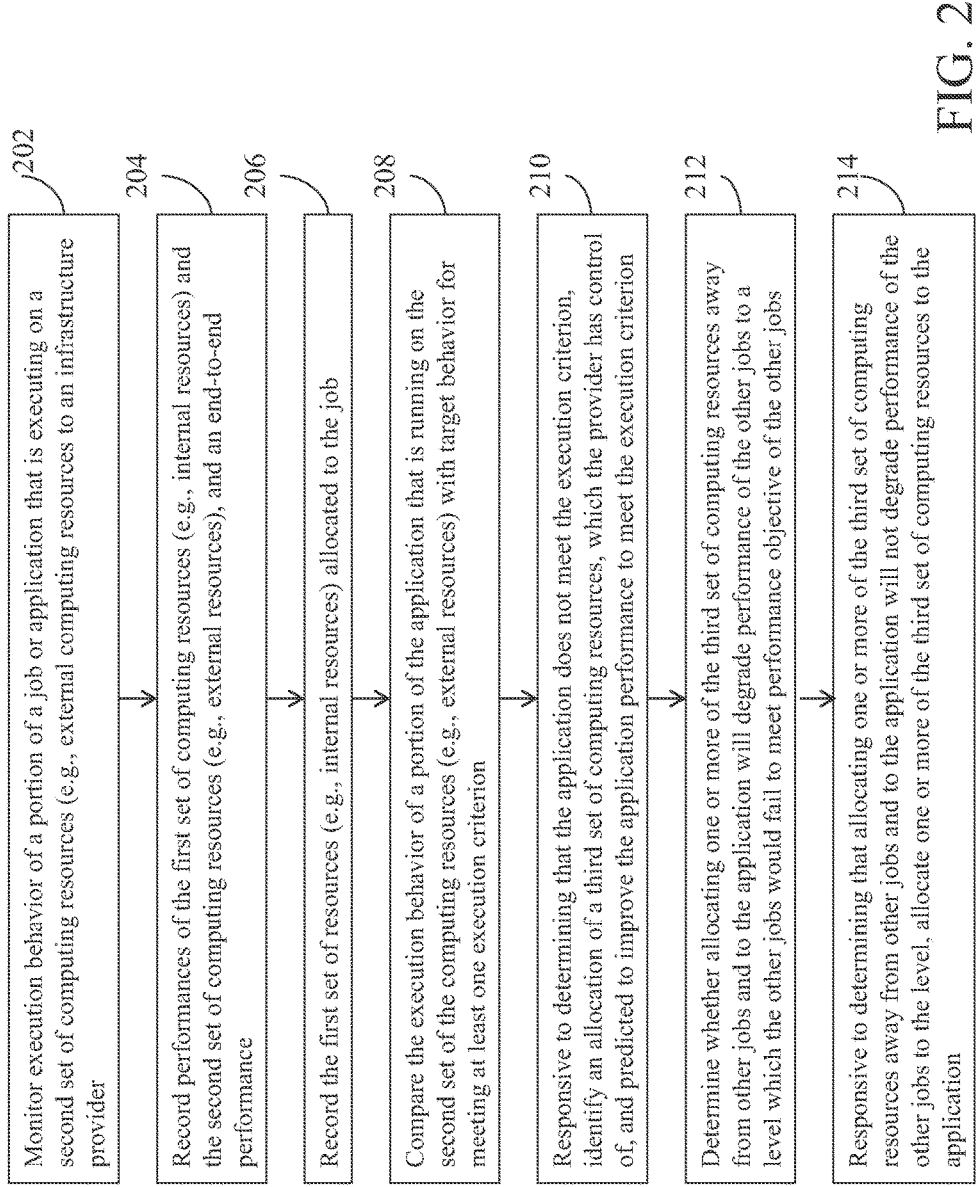
FIG. 2 is another flow diagram illustrating a method of managing workload in one embodiment.

FIG. 2 is a flow diagram illustrating a methodology of the present disclosure in this embodiment. At 202, an execution of an application or a job is monitored. For example, the job or application is running on a hybrid (external/internal) cloud set of resources, for instance, the job or application is running on a first set of computing resources (e.g., internal resources to an infrastructure provider or an entity) and a second set of computing resources (e.g., external resources external to the infrastructure provider or the entity). An infrastructure provider or entity running the application has control over the first set of computing resources (e.g., internal resources to the infrastructure provider) and the entity may not have control of the second set of the computing resources (e.g., external resources to the infrastructure provider). The monitoring includes at least monitoring execution behavior of a portion of the application that is running on the second set of the computing resources (e.g., external resources).

At 204, performance of the internal resources (referred to as a first set of computing resources or resources), performance of external resources (referred to as a second set of computing resources or resources), and an end-to-end performance are recorded.

At 206, the internal resources (referred to as a first set of computing resources or resources) allocated to the application or job are also recorded.

At 208, the execution behavior of the portion of the job executing on the external computing resources (referred to as a second set of computing resources or resources) is compared to the behavior required to attain at least one performance objective, e.g., target behavior for meeting an execution criterion.

At 210, responsive to detecting that the behavior required to attain at least one execution criterion (e.g., performance objective) is not met, e.g., the external resource performance is dropping below the level needed to meet the execution criterion of the job, e.g., a level required to meet the end-to-end performance guarantee, a method in embodiment may identify whether adjusting the second set of computing resources would help in improving the end-to-end performance of the application. For instance, the method may determine or identify additional third set of resources (e.g., internal resources) that can be allocated and will improve performance of the job.

For example, the execution behavior of the portion of the job executing on the external computing resources is compared to the behavior required to attain at least one performance objective, e.g., target behavior for meeting an execution criterion. If is determined that the execution behavior of the portion of the job executing on the external computing resources does not meet the execution criterion, it is determined whether allocating a third set of computing resources internal to the infrastructure (additional internal resources) would improve overall performance of the job in meeting the execution criterion.

At 212, it is determined whether allocating one or more of the third set of computing resource (e.g., one or more internal resources) away from other jobs and to the current application or job will degrade performance of the other jobs to the level where those other jobs would not meet their execution criterion.

At 214, one or more of the third set of computing resources are allocated, responsive to determining that the additional allocation will improve performance and will not result in performance degradation of those other job, from which one or more of the third set of computing resources being taken away, to the level where those other jobs would not meet their execution criterion.

Figure 3:
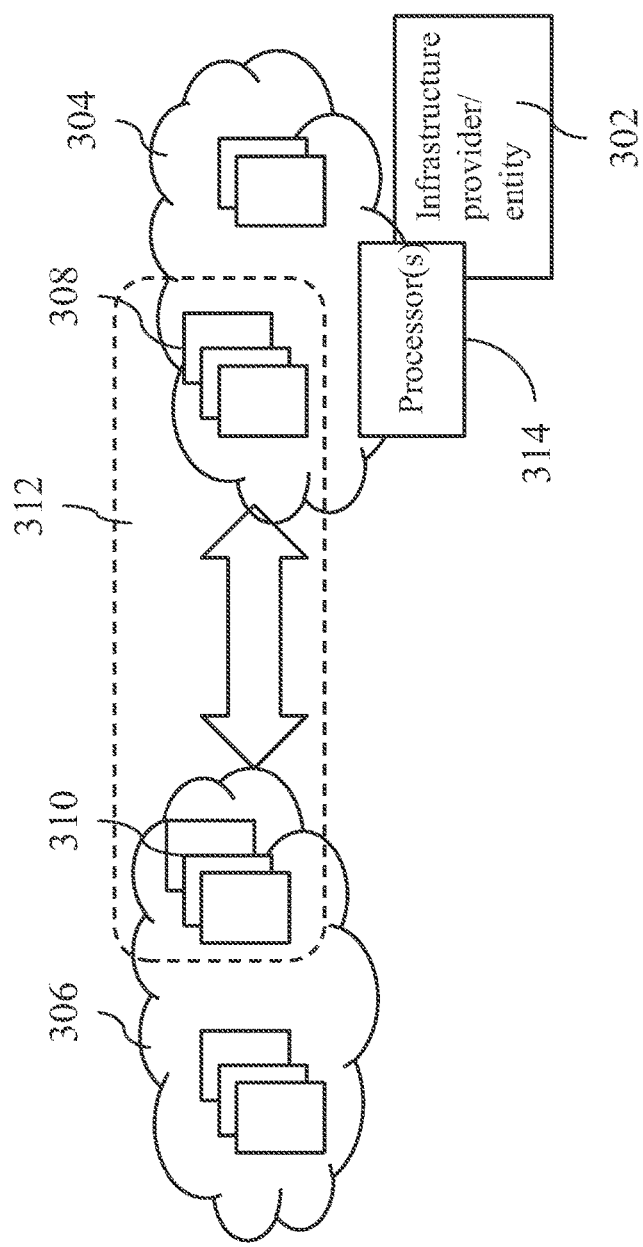
FIG. 3 is diagram showing system components for managing workload in one embodiment of the present disclosure.

FIG. 3 is diagram showing system components for managing workload in one embodiment of the present disclosure. An entity 302 may have an information technology infrastructure that may include a plurality of computing resources 304 internal to the entity. An entity 302 also may utilize a set of resource 306 that is external to the entity, for example, provided by a third party infrastructure. An entity may run an application or job that utilized both the internal resources 304 and the external resources 306. For example, an application 312 may execute on a first set of computing resources 308 internal to the entity and a second set of computing resources 310 external to the entity. A processor 314 may the application 312 running on the first set of computing resources 308 and a second set of computing resources 310, e.g., monitor execution behavior of the application 312 by at least monitoring execution behavior of a portion of the application that is running on the second set of the computing resources 310. The processor 314 may be part of the entity's internal resources. An entity 302 has control over the first set of computing resources 304 but may not have control of the second set of the computing resources 306. The processor 314 may compare the execution behavior of a portion of the application that is running on the second set of the computing resources 310 with target behavior for meeting at least one execution criterion. Responsive to determining that the application does not meet the execution criterion, the processor 314 may identify an allocation of a third set of computing resources that the entity has control of (e.g., one or more of the internal resources 304, and predicted to improve the application performance to meet the execution criterion. The processor 314 may allocate at least one computing resource in the third set of computing resources for the application.

In one embodiment, the processor 314 may allocate at least one computing resource in the third set of computing resources for the application, responsive to the processor determining that taking away the computing resource from another job does not degrade performance of that job to a level where that other job would fail to meet its performance objective or execution criterion.

Figure 4:
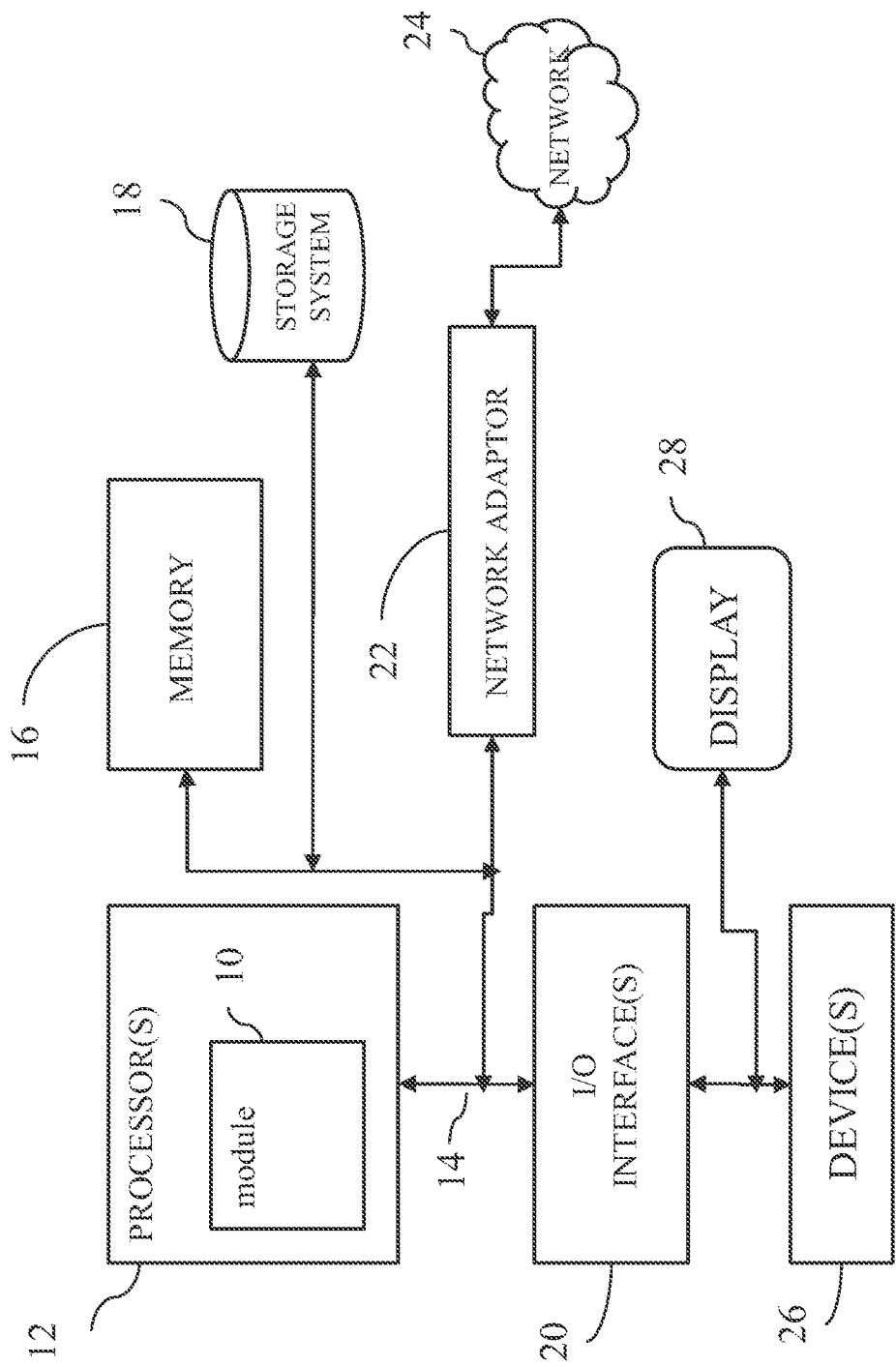
FIG. 4 illustrates a schematic of an example computer or processing system that may implement a work load management system in one embodiment of the present disclosure.

FIG. 4 illustrates a schematic of an example computer or processing system that may implement a workload management system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for managing workload in a computing environment, comprising:
    monitoring execution behavior of a portion of a job that is executing on a second set of the computing resources, the job running on a first set of computing resources and a second set of computing resources, wherein the first set of computing resources are internal resources of an infrastructure and the second set of computing resources are external resources of the infrastructure, wherein the infrastructure running the job controls the first set of computing resources, but does not have control over the second set of computing resources, the internal resources of the infrastructure being operated solely for a first organization owning the infrastructure, and the external resources are owned by a second organization providing a service to the first organization, wherein the external resources are shared by a plurality of organizations;
    comparing the execution behavior of a portion of the job that is running on the second set of the computing resources with target behavior for meeting at least one execution criterion;
    responsive to determining that the portion of the job that is running on the second set of the computing resources which are the external resources provided as the service to the first organization, is performing below a level needed to meet the execution criterion, determining whether allocating a third set of computing resources of the internal resources of the infrastructure would improve overall performance of the job in meeting the execution criterion, the determining comprising at least monitoring a capacity of the first set of computing resources and determining whether the capacity of the first set of computing resources is under stress, and responsive to determining that the capacity of the first set of computing resources is under stress, determining that allocating a third set of computing resources of the internal resources of the infrastructure would improve overall performance of the job in meeting the execution criterion;
    allocating at least one computing resource internal to the infrastructure in the third set of computing resources to the job responsive to determining that allocating a third set of computing resources internal to the infrastructure would improve overall performance of the job in meeting the execution criterion,
    wherein historical behavior of the second set of computing resources that are external resources to the infrastructure are used to allocate internal computing resources that are internal to the infrastructure.

2. The method of claim 1, wherein the execution criterion comprises one or more of throughput, transaction rate, latency, and response time.

3. The method of claim 2, wherein the execution criterion is specified in a service level agreement associated with providing the job as a service.

4. The method of claim 1, wherein the first set of computing resources, the second set of computing resources, and the third set of resources comprise one or more of processing power, memory, disk space, and queues.

5. The method of claim 1, further comprising recording a history of resource utilization and performance of the job.

6. The method of claim 5, further comprising applying analytics to the history to identify relationships between resource availability and performance characteristics of the job.

7. A non-transitory computer readable storage medium storing a program of instructions executable by a machine to perform a method of managing workload comprising:
    monitoring execution behavior of a portion of a job that is executing on a second set of the computing resources, the job running on a first set of computing resources and a second set of computing resources, wherein the first set of computing resources are internal resources of an infrastructure and the second set of computing resources are external resources of the infrastructure, wherein the infrastructure running the job controls the first set of computing resources, but does not have control over the second set of computing resources, the internal resources of the infrastructure being operated solely for a first organization owning the infrastructure, and the external resources are owned by a second organization providing a service to the first organization, wherein the external resources are shared by a plurality of organizations;
    comparing the execution behavior of a portion of the job that is running on the second set of the computing resources with target behavior for meeting at least one execution criterion;
    responsive to determining that the portion of the job that is running on the second set of the computing resources which are the external resources provided as the service to the first organization, is performing below a level needed to meet the execution criterion, determining whether allocating a third set of computing resources of the internal resources of the infrastructure would improve overall performance of the job in meeting the execution criterion, the determining comprising at least monitoring a capacity of the first set of computing resources and determining whether the capacity of the first set of computing resources is under stress, and responsive to determining that the capacity of the first set of computing resources is under stress, determining that allocating a third set of computing resources of the internal resources of the infrastructure would improve overall performance of the job in meeting the execution criterion;

responsive to determining that allocating the third set of computing resources would improve the overall performance of the job in meeting the execution criterion, allocating at least one computing resource internal to the infrastructure in the third set of computing resources to the job responsive to determining that allocating the third set of computing resources would improve the overall performance of the job in meeting the execution criterion, wherein historical behavior of the second set of computing resources that are external resources to the infrastructure are used to allocate internal computing resources that are internal to the infrastructure.

8. The non-transitory computer readable storage medium of claim 7, wherein the execution criterion comprises one or more of throughput, transaction rate, latency, and response time.

9. The non-transitory computer readable storage medium of claim 8, wherein the execution criterion is specified in a service level agreement associated with providing the job as a service.

10. The non-transitory computer readable storage medium of claim 7, wherein the first set of computing resources, the second set of computing resources, and the third set of resources comprise one or more of processing power, memory, disk space, and queues.

11. The non-transitory computer readable storage medium of claim 7, further comprising recording a history of resource utilization and performance of the job.

12. The non-transitory computer readable storage medium of claim 11, further comprising applying analytics to the history to identify relationships between resource availability and performance characteristics of the job.

13. A system of managing workload, comprising:
   a processor;
   a memory device coupled to the processor; and
   a first set of computing resources;
   a job running on the first set of computing resources and a second set of computing resources, wherein the first set of computing resources are internal resources of an infrastructure and the second set of computing resources are external resources of the infrastructure, the internal resources of the infrastructure being operated solely for a first organization owning the infrastructure, and the external resources are owned by a second organization providing a service to the first organization, wherein the external resources are shared by a plurality of organizations,
   the processor operable to monitor execution behavior of a portion of a job that is executing on a second set of the computing resources, the job running on a first set of computing resources and a second set of computing resources,
   the processor further operable to compare the execution behavior of the portion of the job that is running on the second set of the computing resources with a target behavior for meeting at least one execution criterion,
   responsive to determining that the portion of the job that is running on the second set of the computing resources which are the external resources provided as the service to the first organization, is performing below a level needed to meet the execution criterion, the processor further operable to determine whether allocating a third set of computing resources which are the internal resources of the infrastructure would improve overall performance of the job in meeting the execution criterion, the processor determining whether the capacity of the first set of computing resources is under stress, and responsive to determining that the capacity of the first set of computing resources is under stress, determining that allocating a third set of computing resources which are the internal resources of the infrastructure would improve overall performance of the job in meeting the execution criterion,
   the processor further operable to allocate at least one computing resource internal to the infrastructure in the third set of computing resources for the job,
   wherein historical behavior of the second set of computing resources that are external resources to the infrastructure are used to allocate internal computing resources that are internal to the infrastructure,
   wherein the processor has control over the first set of computing resources, but does not have control over the second set of computing resources.

14. The system of claim 13, wherein the processor is operable to allocate at least one computing resource in the third set of computing resources for the job, responsive to the processor determining that taking away said at least one computing resource from another job does not degrade performance of said another job to a level where said another job would fail to meet performance objective of said another job.

15. The system of system 13, wherein the execution criterion comprises one or more of throughput, transaction rate, latency, and response time.

16. The system of claim 15, wherein the execution criterion is specified in a service level agreement associated with providing the job as a service.

17. The system of claim 13, wherein the first set of computing resources, the second set of computing resources, and the third set of resources comprise one or more of processing power, memory, disk space, and queues.

18. The system of claim 13, further comprising recording a history of resource utilization and performance of the job.

19. The system of claim 18, further comprising applying analytics to the history to identify relationships between resource availability and performance characteristics of the job.

* * * * *